March 14, 1967  A. L. ALMERINI ET AL  3,309,230
AMMONIA CELL
Filed Sept. 29, 1964
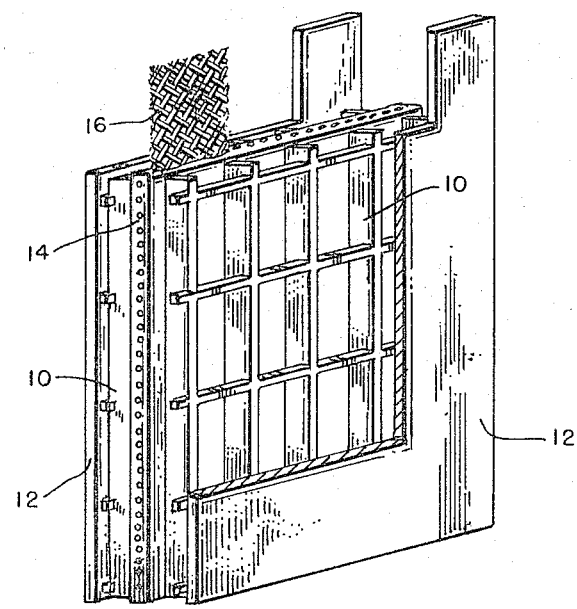
INVENTORS,
ACHILLE L. ALMERINI
HOWARD R. KNAPP
BY
ATTORNEYS 3,309,230
AMMONIA CELL
Achille L. Almerini, New Monmouth, and Howard R. Knapp, Red Bank, N.J., assignors to the United States of America as represented by the Secretary of the Army
Filed Sept. 29, 1964, Ser. No. 400,284
1 Claim. (Cl. 136—90)

The invention described herein may be manufactured and used by or for the Government for governmental purposes without the payment of any royalty thereon.

This invention relates to an electric current producing cell that utilizes a liquid anhydrous ammonia solution of potassium thiocyanate as the electrolyte.

Electric current producing cells containing liquid ammonia as the principal electrolyte solvent have been suggested heretofore as being capable of operation at temperatures well below the freezing temperature of water. One such electric current producing cell which has received attention because of its high theoretical electrical energy output in operation at temperatures of −30° F. to −80° F. is comprised of a magnesium anode, a cathode in which sulfur is the depolarizing material, and an electrolyte consisting of a liquid anhydrous ammonia solution of 35 percent by weight of the solution of potassium thiocyanate, the anode and cathode being separated by a plastic spacer. A difficulty however, is encountered with the above cell in operation at −30° F. to −80° F. That is, the sulfur cathode is quite soluble and reacts with ammonia to form $N_4S_4$ and various polysulfides so that only part of the theoretical electrical energy output is realized.

An object of this invention is to provide an improved electric current producing cell which is operable at temperatures from −30° F. to −80° F. A further object of this invention is to increase the electrical energy output per unit weight of such a cell.

It has now been found that the aforementioned objectives can be attained and the above listed disadvantage overcome by providing an electric current producing cell that utilizes a liquid anhydrous ammonia solution of potassium thiocyanate as the electrolyte. The electric current producing cell of the invention is comprised of a magnesium anode, a cathode in which sulfur and cuprous chloride are the active depolarizing materials the sulfur content varying from equal amounts up to a 2 to 1 ratio with respect to the cuprous chloride, and the aforementioned electrolyte in which the potassium thiocyanate constitutes 35 percent by weight of the solution, the anode and cathode being separated by a plastic spacer.

The electric current producing cell of the invention employs sheet anodes, a pressed cathode, and a plastic spacer for electrode separation. The spacer allows for fast penetration of the electrolyte solution throughout the cell. The spacer can have various shapes. That is, it can be a corrugated and perforated plastic sheet for example, or a screen of plastic bars with wide openings in order to provide free flow of the electrolyte and minimum internal cell resistance. Such a spacer provides for the maintenance of maximum free volume between the anode and the cathode of the cell, and also provides for minimum contacting surfaces between the faces of the anode plate and separator and between the faces of the cathode plate and separator. The maximum free volume is essential to allow for expansion of the anode and cathode plates due to formation of cell reaction products formed by initial reaction with the electrolyte or through cell discharge, to provide minimum cell resistance, and to provide maximum ionic mobility in the electrolyte.

Essentially, the electric current producing cell of the invention will consist of a three-plate sandwich design with the cathode in the center, a separator or spacer on either side of the cathode and a thin magnesium anode placed against the outside of each separator. The cathode consists of a flat plate design in which sulfur and cuprous chloride as the depolarizing compounds are thoroughly mixed with non-reactive conductive material such as graphite or carbon black to provide adequate conductivity to the plate. The cathodic mix is then heat pressed on both sides of an expanded metallic grid structure. The material of the metallic grid structure must be non-reactive with the liquid ammonia electrolyte. Materials such as titanium, silver, aluminum, or stainless steel serve the purpose well.

A cutaway view of the electric current producing cell of the invention is illustrated in the drawing.

Referring to the drawing, corrugated and perforated plastic sheet spacers, 10, separate the thin sheet magnesium anodes, 12, from the cathode, 14. The cathode, 14, consists of a flat plate design pressed on both sides of an expanded grid structure, 16.

*Example 1*

The anode is made of a thin sheet of magnesium which is pickled with acid and polished with steel wool. The cathode is made by applying sulfur-cuprous chloride mixtures in the weight ratio range of 3 parts sulfur to 2 parts cuprous chloride with about 10 to 12 weight percent carbon to an expanded nickel grid. The cathode mix is heat pressed on to the grid, or alternatively applied as a wet paste with 1 to 1.5 weight percent polystyrene binder using toluene as the paste wetter.

The cell is made of one cathode and two anodes as illustrated by the drawing. The cathode is separated from each of the anodes by a plastic spacer 0.04 inch thick. This barrier allows free flow of the electrolyte. To increase the mechanical stability of the cell and improve the separation of negative and positive material, the cathode can be wrapped in one or more layers of thin filter paper.

The electrolyte used is a liquid anhydrous ammonia solution containing 35 percent by weight of the solution of potassium thiocyanate. When this electrolyte is introduced into the cell at −65° F. at a load voltage of 1.90 to 1.50 volts, a current density of 250 milliamperes per square inch is obtained for 30 to 31 minutes.

If, on the other hand, one substitutes a cathode containing only sulfur as the depolarizing material into the above cell at −65° F. at a load voltage of 1.90 to 1.50 volts, a current density of 250 milliamperes per square inch is obtained for only 23 minutes.

The electric current producing cell of the invention is amenable to reserve type operation. That is, the electrolyte can be separated from the rest of the cell up to the moment when the cell is actually used.

The foregoing description is to be considered merely as illustrative of the invention and not in limitation thereof.

What is claimed is:

An electric current producing cell comprising a magnesium anode, a cathode including an expanded metallic grid structure having a mixture pressed on both sides thereof wherein said mixture is of sulfur and cuprous chloride the sulfur content varying from equal amounts up to a 2 to 1 ratio with respect to the cuprous chloride thoroughly mixed with non-reactive conductive material selected from the group consisting of graphite and carbon black, and an electrolyte consisting of a liquid anhydrous ammonia solution containing 35 percent by weight of the solution of potassium thiocyanate, said anode and cathode being separated by a plastic spacer.

References Cited by the Examiner

UNITED STATES PATENTS

| 3,082,284 | 3/1963 | Mount | 136—120 |
| 3,205,096 | 9/1965 | Honer | 136—90 X |

WINSTON A. DOUGLAS, *Primary Examiner.*

B. J. OHLENDORF, A. SKAPARS, *Assistant Examiners.*